W. H. HILL.
VEHICLE SPRING CONSTRUCTION.
APPLICATION FILED OCT. 28, 1920.
Reissued Apr. 4, 1922. 15,326.
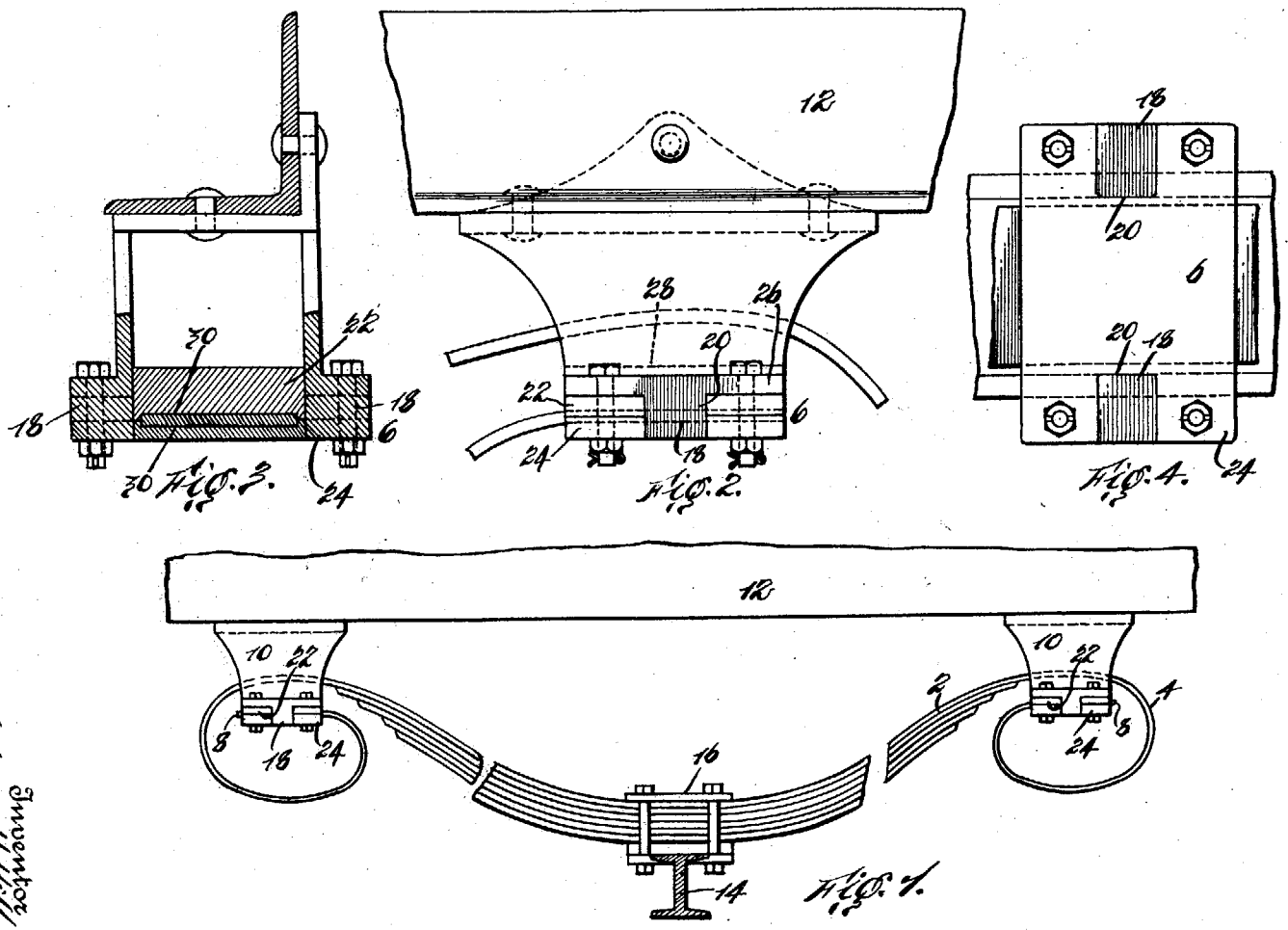
Inventor
William H Hill
By his Attorneys
Newell and Spencer

UNITED STATES PATENT OFFICE.

WILLIAM H. HILL, OF CANTON, OHIO.

VEHICLE-SPRING CONSTRUCTION.

15,326. Specification of Reissued Letters Patent. Reissued Apr. 4, 1922.

Original No. 1,334,700, dated March 23, 1920, Serial No. 328,221, filed October 3, 1919. Application for reissue filed October 28, 1920. Serial No. 420,283.

*To all whom it may concern:*

Be it known that I, WILLIAM H. HILL, a citizen of the United States, residing at Canton, Ohio, have invented certain new and useful Improvements in Vehicle-Spring Construction, of which the following is a clear, full, and exact description.

This invention relates to vehicle springs and has for its general object to provide a vehicle spring construction which will furnish a more effective cushion than known springs for the shocks and jars to which a vehicle is subjected in traveling, which will not require bearings or means for lubricating bearings, which can be connected to the vehicle in a simple manner and which will not require as much attention at the points of connection as known springs.

Other objects and important features of the invention will appear from the following description and claims when considered in connection with the accompanying drawings, in which—

Figure 1 is a side elevation partly in section, showing a spring embodying the invention and so much of the associated body and chassis of the vehicle as are necessary to illustrate the use of the spring;

Fig. 2 is a detail view of one of the spring supports;

Fig. 3 is a detail view of one of the spring clamps; and

Fig. 4 is a bottom plan view of the spring clamp.

As shown in the drawings, the main part of the spring, in which the invention is embodied, is of the semi-elliptic leaf spring type, the illustrated spring being shown as having its concave face and its longest leaf 2 on the upper side. Instead of being connected to a spring shackle or other spring bearing by means of a loop or an eye formed in the uppermost spring leaf, the spring of the present invention has the uppermost leaf 2 extended and curved at its ends to form spirals 4 which are shown as reversely curved so that they encircle the clamps 6 in which the ends 8 of the leaf and of the spirals are held, each of the spirals preferably extending to the inner side of the spring support 10 in which the clamp 6 is carried.

It will be noted that the spring support 10 is preferably made in the form of a fork or yoke so that the upper part of the spiral 4 may pass through between two sides of the support and above the clamp 6 and then around below the clamp 6 to the inner side of the clamp and support 10, the supports 10 being connected to the body 12 of the vehicle in any suitable manner and the intermediate semi-elliptic part of the spring being connected to the axle 14 of the vehicle by any suitable and well-known spring clamp 16.

To facilitate the clamping of the ends 8 of the spring leaf 2 and of the spirals 4 in the supports 10, the supports 10 and clamp 6 are preferably of the special construction illustrated in Figs. 2 and 3. From an inspection of these figures it will be shown that each side of the support 10 has a downwardly extending part 18 adapted to fit into a recess 20 in the side of each of the spring clamp members 22, 24, and has upon each side of this extension a flange 26 to receive the clamping bolts which pass through the clamp members and said flanges. The upper clamp member 20 preferably has a shoulder 28 to insure its proper centering between the legs of the spring support, and each of the clamp members preferably also has a channel 30 to receive the end 8 of the spring leaf 2, each channel being shallow enough so that the two channels do not equal the thickness of the spring.

From the foregoing description, the operation and utility of the novel spring construction will be apparent. When the semi-elliptic intermediate portion of the spring is flexed so that the spring tends to straighten, the outward movement of the ends of this intermediate portion will cause an unwinding action of the spirals 4 without any tendency to disturb the connection of the end 8 of the spiral with the spring support 10. Sudden sharp shocks or jolts will be taken up in the spirals 4 without perceptible bending of the intermediate semi-elliptic part of the spring, the extension of the spirals 4 both above and below the clamps 6 providing ample space and flexibility for this shock absorbing action.

What I claim as new is:

1. A vehicle spring having its ends rigidly held and comprising a semi-elliptic intermediate portion between the end portions thereof, and a reversely curved spiral connected as a unit with and forming an extension of said intermediate portion and located between the intermediate portion and each end.

2. A vehicle spring of the leaf spring type having one leaf rigidly held at its ends and comprising a semi-elliptic intermediate portion between the end portions thereof, and a reversely curved spiral connected as a unit with and forming an extension of said intermediate portion and located between said intermediate portion and each end.

3. In a vehicle spring construction, the combination with fixedly spaced spring supports, of a spring of the leaf spring type having one leaf rigidly connected at its respective ends to said spring supports and comprising an intermediate semi-elliptic portion and a spiral connected as a unit with and forming an extension of said intermediate portion and located between said intermediate portion and each connected end, said spiral extending to the inner side of the associated spring support and encircling the point of connection.

4. A vehicle spring having at least one end rigidly held and comprising an intermediate portion constructed with substantially the curvature of an arc of an ellipse and a reversely curved spiral connected as a unit with and forming an extension of said intermediate portion and located between the intermediate portion and the said rigidly held end.

5. A vehicle spring construction having, in combination, a spring having an intermediate portion constructed with a curvature in one direction and a spiral curved in the reverse direction connected as a unit with and forming an extension of said intermediate portion, a member supporting the spring, a member supported by the spring, and means for securing the spiral rigidly to one of said members.

6. A vehicle spring construction having, in combination, a spring having an intermediate portion constructed with a curvature in one direction, a reversely curved spiral connected as a unit with and forming an extension of said intermediate portion, a member supporting the spring, a member supported by the spring, and means for connecting one of said members with the inner end of the spiral portion of the spring so that the weight of the vehicle and load is supported at said inner end of the spiral portion of the spring, comprising devices for holding the spiral portion of the spring from turning at its point of connection with said means.

7. A vehicle spring construction having, in combination, a spring having an intermediate portion constructed with a curvature in one direction and a reversely curved spiral connected as a unit with and forming an extension of said intermediate portion, a member supported by the spring, a member supporting the spring, means for rigidly connecting the intermediate portion of the spring to one of said members, and means for rigidly connecting the inner end of said spiral to the other of said members.

8. A vehicle spring construction having, in combination, a spring having an intermediate portion made up of a plurality of leaves and constructed with a curvature as a whole in one direction one of which leaves is formed into a spiral at one end curved in a direction reverse to that of the intermediate portion of the spring, a member supporting the spring, a member supported by the spring, and means for securing the spiral rigidly to one of said members.

9. A vehicle spring construction having, in combination, a spring having an intermediate portion made up of a plurality of leaves and constructed with a curvature as a whole, said spring comprising a leaf extending from one end to the other of the spring and formed into spirals at its ends curved in a direction reverse to that of the intermediate portion of the spring, a member supporting the spring, a member supported by the spring, and means for securing the spirals rigidly to one of said members.

Signed at Canton, Ohio, this 23rd day of October, 1920.

WILLIAM H. HILL.